Dec. 24, 1935.  W. W. KEMP  2,025,687
MELTING POT HEATER
Filed Jan. 12, 1935  3 Sheets-Sheet 1
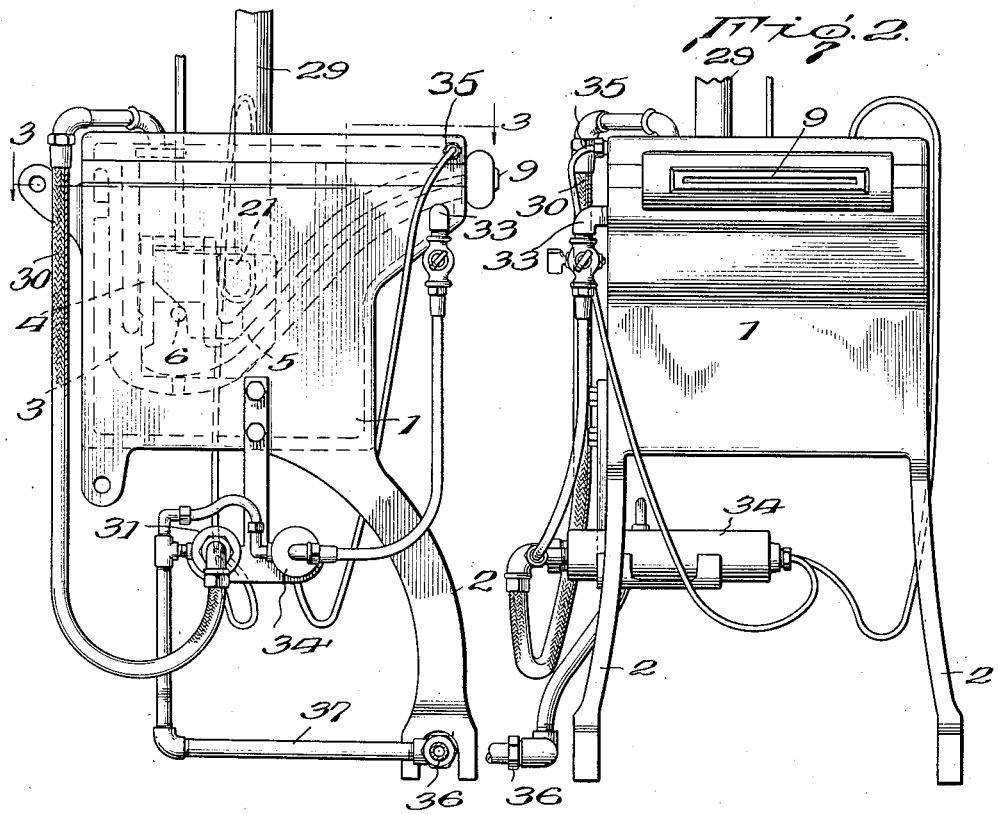
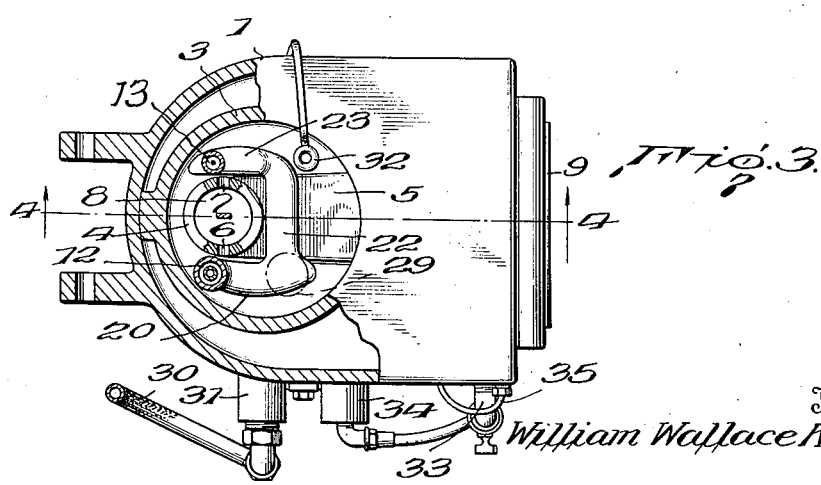
Inventor
William Wallace Kemp,
By Thomas W. J. Clark
Attorney

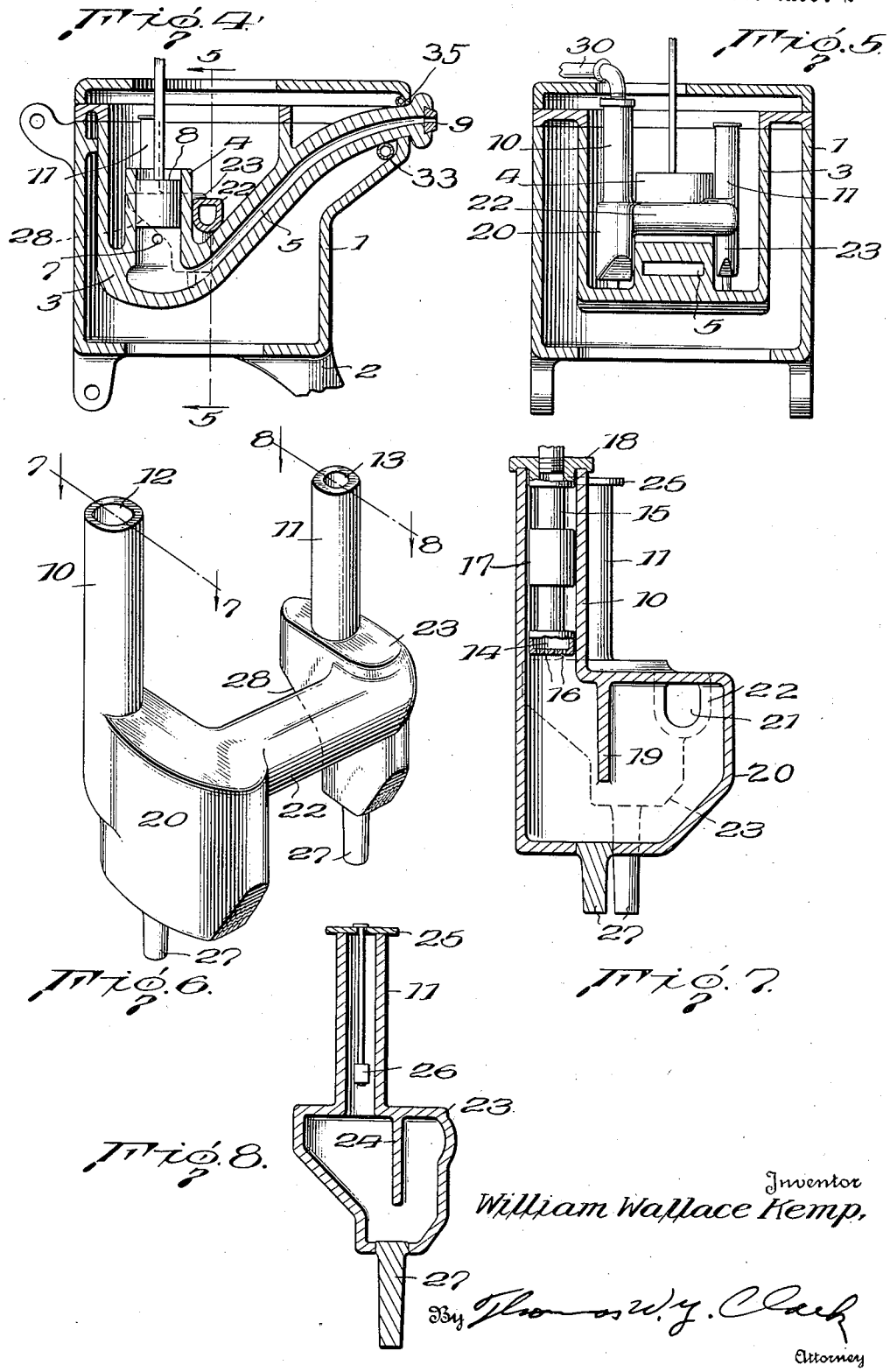

Dec. 24, 1935. W. W. KEMP 2,025,687
MELTING POT HEATER
Filed Jan. 12, 1935 3 Sheets-Sheet 3
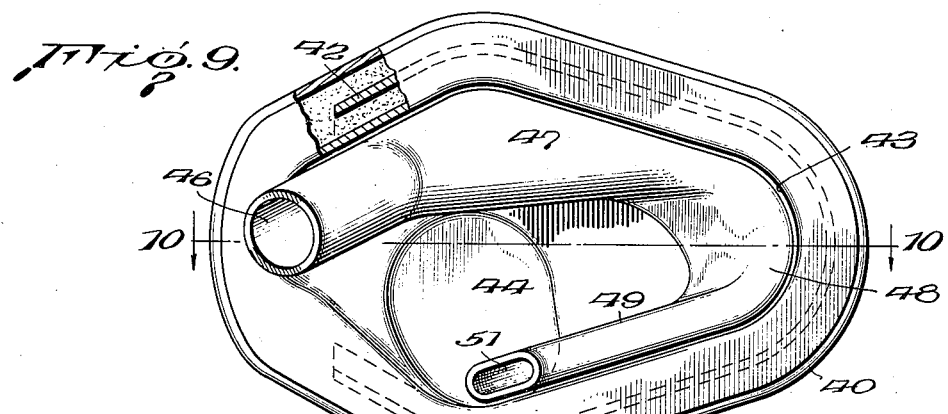
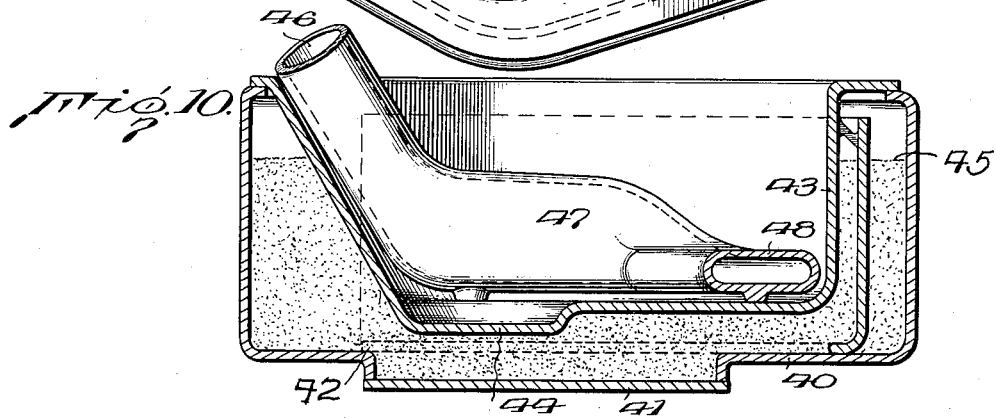
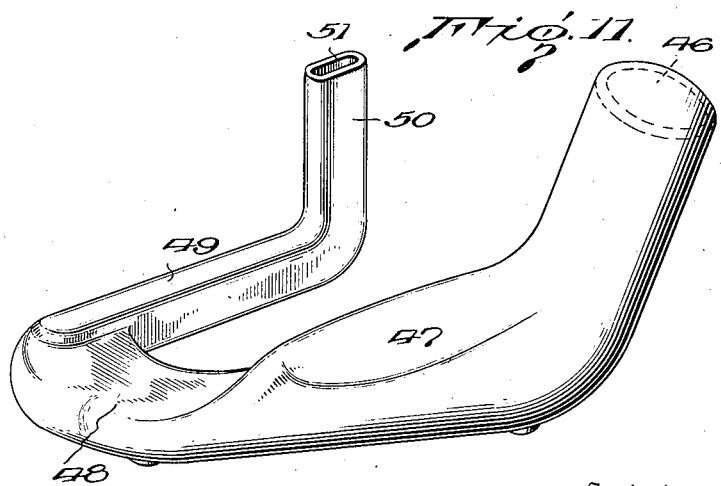
Inventor
William Wallace Kemp,
By Thomas W. J. Clark
Attorney Patented Dec. 24, 1935

2,025,687

UNITED STATES PATENT OFFICE 2,025,687

MELTING POT HEATER

William Wallace Kemp, Baltimore, Md., assignor to The C. M. Kemp Manufacturing Company, Baltimore, Md., a corporation of Maryland Application January 12, 1935, Serial No. 1,573

8 Claims. (Cl. 263—14)

My invention relates to an immersion melting unit for a type casting machine such as a linotype, intertype, monotype or other machine.

The type metal pots or crucibles of such machines have been heated externally by gas or electricity, or a combination of the two, and sometimes the pots have been specially constructed for the particular heating means employed. Such pots have also been heated internally by electricity.

The primary object of my invention is to heat such pots internally by fluid fuel, such as gas or oil. A completely combustible mixture of fluid fuel and air may be admitted to the element so that when the pot is in operation the resultant products of combustion contain no injurious fumes.

These pots are surrounded by other operating parts of the machine, and usually a number of parts extend into the pot, such as the pump, the metal feed and feed regulator, and the thermostat, so the space that may be utilized both within and without the pot is very limited. Also, certain of the pots are subjected to a great deal of vibration in their constant rocking movements.

Externally heated pots require first that the pot itself be heated, and since the walls of the pots must be thick to sustain the weight of metal in the moving pot, considerable heat is thus consumed. Pots heated in this way are not subject to so accurate temperature control as is the pot where the heating element is in the pot in direct contact with the metal and the surface area of the heating element is comparatively large.

My heating means have been found to use only about one-third of the gas usually used by the gas heated pot.

The wastefulness and difficulty of control of such external heating has long been known, and the internal electrical means were proposed. The economic spread between the cost of electricity and gas is almost always sufficient, however, to allow considerable saving in the use of the internal gas heating means herein described.

Another object of my invention is to make a heater that will heat the metal quickly, and that will heat it at the surface as well as in the body of the pot, so that the pot will not be subjected to the strain of expanding melting metal at the bottom and be sealed at the top by cold metal.

Another object of my invention is to heat the pot most at the places requiring the most heat, i. e., near the pump well, near the throat inlet, and near the inlet for cold metal.

Another object of my invention is to shape the element so that it will not only give the most conduction but also so that it will be out of the way of the other operating machine parts.

Another object of my invention is to shape the element so as to get the most heating value out of a given amount of fuel. Enlarging and constricting the path gives the heat current a scrubbing action on the walls of the element, which makes the current give up most of its heat. Frequent bends in the element and baffles therein also have this effect. In normal practice, after the metal is heated, the exhaust is substantially the temperature of the metal.

Another object of my invention is to make an element that may be used readily in the pots now in use.

I prefer to control the operation of my heating element with a thermostat in the metal, and also I prefer to heat the mouth of the throat with a separate gas heater likewise controlled by a thermostat.

With the uniform heating that I obtain, much higher type casting rates are possible and also much more uniformity of slugs, since the heat is applied directly to the metal—the pot may be jacketed to prevent cooling by drafts, and the heat is controlled by a thermostat also directly in the metal.

I attain these and other objects and advantages, as will appear from the following description and the accompanying drawings forming a part hereof and in which:

Figure 1 is a side view of a melting pot embodying my invention.

Figure 2 is a rear elevation of the same.

Figure 3 is a top plan view thereof, partly in section, substantially on line 3—3 of Figure 1.

Figure 4 is a sectional view thereof, on line 4—4 of Figure 3.

Figure 5 is a sectional view thereof on line 5—5 of Figure 4.

Figure 6 is a perspective view of my new heating element.

Figure 7 is a vertical sectional view on line 7—7 of Figure 6, showing the burner therein.

Figure 8 is a similar view on line 8—8 of Figure 6, showing the cap thereon.

Figure 9 is a top plan view of my new heating element as applied to a pot of another machine.

Figure 10 is a vertical sectional view thereof on line 10—10 of Figure 9.

Figure 11 is a perspective view of the modified heating element.

In the drawings similar numerals refer to similar parts throughout the several views.

The jacket 1 has suitable supports 2 about the lower ends of which it is rocked. Within the jacket the pot 3 is mounted, and the space between the pot and jacket, usually used for the heating means, is filled with insulating material, which keeps the heat within the pot. The pot has the usual pump well, or subchamber 4 and throat 5, through which metal, admitted to the well through openings 6, 7, is forced up the throat by pump plunger 8. The throat has a mouth 9.

In place of the usual heating means, I employ my new heating element, which is essentially a hollow body, shown generally in Figure 6, into which a current of burning fuel is passed. The member is shown with upper extensions, 10 and 11, having openings 12 and 13, respectively, in the top thereof. Through the larger of these openings a burner 14 is inserted. This burner is at the lower end of a long tube 15, and has a number of orifices 16 at the end thereof. The tube has a sleeve or collar 17 to serve as a guide and make a tight fit with the extension 10. The top of the burner has a cap 18 with turned down edges thereon, and this cap and the sleeve also, serve to prevent escape of combustion gas. The flame projects from the burner only a short distance, but the hot products of combustion are forced around baffle 19 in the large side 20 of the element, through the restricted passage 21 in the joining part 22, to the small side 23 of the element, where it passes around another baffle 24 before it escapes through opening 13 in extension 11. This opening 13 has a cap 25 thereon, which is slightly weighted down by weight 26. This cap forces the exhaust gases to escape laterally, rather than straight up. Sides 20 and 23 both have feet 27 thereon which rest on the bottom of the pot. The element is placed in the pot so that the large part 20 is slightly removed from the inlet 6 of pump well 4. It passes down beside the bottoms of both the well and the throat. The joining or cross part 22 passes between the well 4 and the throat 5, and adjacent the entrance of the latter. The small part 23 is formed with a partly sloping bottom, as at 28, to allow metal to enter opening 7 in the well.

The cold metal is shown at 29 and it may be fed by what is known as a Bargach feeder, or any other means or small pigs can be put in by hand. One of the hottest parts of the heating element is preferably under the entrance of cold metal, as shown, for this metal should be brought to the temperature of that in the pot as soon as possible. The extensions with their openings projecting above the level of the pot have a comparatively small horizontal area to be in the way of the other machine parts and the exposed area of the heating surface in contact with the metal is comparatively large.

The metal is melted at the surface in the initial heating of the pot, around extension 10 almost as soon as it is heated in the body of the pot so that the expanding melting metal in the body of the pot does not expand and crack the pot, but rather escapes by the hot sides of extension 10.

The constricting of the passage for the heat current not only increases its velocity and gives scrubbing action to the current, on the member walls, to extract the most heat, but as the current gets further from the burner, it has less heat to give up, and the constricting of the body passages makes the current heat less body or passage metal, and so passes the heat, to a greater degree, to the type metal than a passage of uniform size would do.

The burner is removed from opening 12 to be lighted, and it is at one end of a flexible tube 30, the other end of which leads into a thermostatically controlled valve 31. The tube leading from the bulb 32 of the thermostat passes under the pot, as shown. The bulb being in the metal in the pot, and the heating element being of comparatively large area, and also in the metal, the regulation of the heat supplied can be very accurate. The insulating of the pot from room air currents also helps materially in maintaining a steady temperature of the casting metal.

The additional heater 33 is placed slightly back of the mouth 9, and heats the mouth of the throat 5 also. This heater is controlled by a thermostatic valve 34, and the bulb 35 is preferably placed above the mouth 9. This location of the heater 33 and bulb 35 gives accurate heat control of the upper part of the throat and mouth.

A swing joint 36 connects the fuel pipe 37 to the main feed line.

It will be apparent that my new heater can be applied to pots of varying internal shapes and with varying machine parts therein, and I have shown in the other figures the application of the heater to a monotype pot. The pot in this machine must operate in a very crowded space and more operating parts of the machine are in the pot, so the space available for a heating element is limited, and the element must be designed and placed to give the required heat. This is done with the element here shown. These pots are substantially triangularly shaped and have an inner and outer casing around them and the gas burner generally plays upon the bottom of the pot, through an opening in both the casings.

I modify the pot by closing the opening in the outer casing 40 by a plate 41. I cut off the end of the inner casing which has the flue outlet therein, and thus obtain more room for a new pot, substantially diamond shaped. The cut off inner casing is shown at 42; and the new pot is shown at 43. The pot has a depression 44 therein for the pump. The space between the casings and pot, usually used for heat circulation is packed with insulation 45.

The heating element for this pot is shaped as shown in Figure 11, being substantially U shape in plan view with an inlet 46 for the burner, and a large portion 47 in one leg, which is right under the entrance of cold metal, and is almost the only part of the pot exposed to view when the same is in operation. The member is then flattened in making the bend at the end of the pot, as at 48. The inner area of the member is then slightly reduced, and made more square as at 49, and turned up at 50 near the pump depression. These changes of configuration not only conform to the available space in the pot, but they change the direction and shape of the heat current, and aid in extracting the heat from the current. The exhaust opening 51 may be closed by a cap such as shown in the other modification.

Other modes of applying the principle of my invention may be employed instead of those explained, change being made as regards the mechanism herein disclosed provided the means stated by any of the following claims or the equivalent of such stated means be employed.

I claim:

1. In combination, a melting pot for type casting machines and the like having a main chamber and a subchamber, a heater immersed in the metal in the pot comprising a hollow body partially surrounding the subchamber and having a relatively large portion adjacent the entrance of cold metal to the pot, and baffles in said portion to make a circuitous path therethrough and relatively small inlet and exhaust tubular passages for said body and means to project ignitible fluid fuel into said body through said inlet passage.

2. In combination, a melting pot for type casting machines and the like having a main chamber and a subchamber, a throat leading from said subchamber, a heater immersed in the metal in the pot comprising a hollow body having a circuitous path therethrough and a relatively large external area adjacent said subchamber and the entrance to the throat and a section of smaller area passing between said subchamber and the entrance to the throat, relatively small inlet and exhaust tubular passages for said body extending without the metal in the pot and means to project ignitible fluid fuel into said body through said inlet passage.

3. In combination, a melting pot for type casting machines and the like having a main chamber and a subchamber, a throat leading from said subchamber, a heater immersed in the metal in the pot comprising a hollow body having a portion of relatively large external area extending substantially to the bottom of said subchamber and the throat entrance on one side thereof and a portion of smaller area extending between the throat and subchamber, relatively small inlet and exhaust tubular passages for said body and means to project ignitible fluid fuel into said body through said inlet passage.

4. In combination, a melting pot for type casting machines and the like, a heater immersed in the metal in the pot comprising a hollow body shaped to conform to the interior of a substantially diamond shaped pot and having inlet and exhaust openings therefor extending without the metal in said pot, said body extending in one direction adjacent the inlet thereof with a relatively large area and extending in a return direction adjacent the exhaust thereof with relatively small area passing on opposite sides of and adjacent the pump area of said pot.

5. The combination with a melting pot for type casting machines and the like adapted to operate in a crowded space and with casting machinery partly in the pot, a heater immersed in the metal in the pot comprising a hollow body substantially U shaped in plan view extending substantially around the sides of a substantially diamond shaped pot, inlet and exhaust openings for said body, extending without the metal in the pot adjacent one end of the pot, said body being enlarged in one leg adjacent the inlet opening thereof, and means to project ignitible fluid fuel into said body through said inlet opening.

6. In combination, a melting pot for type casting machines and the like having a main chamber and a subchamber, a heater immersed in the metal in the pot comprising a hollow body having two portions of relatively large external area one on each side of said subchamber, and a passage of relatively small cross sectional area therebetween, relatively small inlet and exhaust tubular passages for said body and means to project ignitible fluid fuel into said body through said inlet passage.

7. In combination, a melting pot for type casting machines and the like, a heater immersed in the metal in the pot comprising a hollow body having a relatively large external area adjacent the entrance of cold metal to the pot and at one side of the pot pump area and a smaller portion at the opposed side of the pump area and a passage therebetween, inlet and exhaust openings for said body extending without the metal in the pot and means to project ignitible fluid fuel into the body through said inlet opening.

8. In combination, a melting pot for type casting machines and the like having a main chamber and a subchamber, a throat leading from said subchamber, a heater immersed in the metal in the pot comprising a hollow body having a portion of relatively large external area adjacent said subchamber and having deflecting baffles therein and a portion of smaller area extending between the throat and said subchamber, relatively small inlet and exhaust tubular passages for said body and means to project ignitible fluid fuel into said body through said inlet passage.

WILLIAM WALLACE KEMP.